(12) United States Patent
Martin

(10) Patent No.: US 11,383,750 B2
(45) Date of Patent: Jul. 12, 2022

(54) VEHICLE STEERING ASSEMBLY

(71) Applicant: Bayerische Motoren Werke Aktiengesellschaft, Munich (DE)

(72) Inventor: Robert Martin, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 110 days.

(21) Appl. No.: 16/597,972

(22) Filed: Oct. 10, 2019

(65) Prior Publication Data

US 2020/0039560 A1  Feb. 6, 2020

Related U.S. Application Data

(63) Continuation of application No. PCT/EP2018/056323, filed on Mar. 14, 2018.

(30) Foreign Application Priority Data

Apr. 24, 2017  (DE) ...................... 10 2017 206 872.8

(51) Int. Cl.
*B62D 1/10* (2006.01)
*B60N 3/00* (2006.01)
*G05D 1/02* (2020.01)

(52) U.S. Cl.
CPC ............... *B62D 1/10* (2013.01); *B60N 3/005* (2013.01); *G05D 1/021* (2013.01)

(58) Field of Classification Search
CPC ... B62D 1/02; B62D 1/04; B62D 1/10; B60N 3/001; B60N 3/002; B60N 3/005; B60W 50/12; G05D 1/021
See application file for complete search history.

(56) References Cited

U.S. PATENT DOCUMENTS

| | | | |
|---|---|---|---|
| 6,389,858 B1 | 5/2002 | Lee | |
| 9,834,121 B2* | 12/2017 | Riefe | B62D 1/04 |
| 10,322,682 B2* | 6/2019 | Faist | B60K 37/06 |
| 10,526,002 B2* | 1/2020 | Schwarz | B62D 1/183 |
| 2011/0187090 A1* | 8/2011 | Wihinen | B62D 1/18 |
| | | | 74/552 |
| 2016/0244070 A1* | 8/2016 | Bendewald | B62D 1/183 |
| 2016/0347348 A1* | 12/2016 | Lubischer | G05D 1/0088 |
| 2016/0368522 A1* | 12/2016 | Lubischer | B62D 1/105 |

(Continued)

FOREIGN PATENT DOCUMENTS

CN       106114602 A    11/2016
CN    ON 106494490 A     3/2017

(Continued)

OTHER PUBLICATIONS

International Search Report (PCT/ISA/210) issued in PCT Application No. PCT/EP2018/056323 dated Jun. 25, 2018 with English translation (four (4) pages).

(Continued)

*Primary Examiner* — Prasad V Gokhale
(74) *Attorney, Agent, or Firm* — Crowell & Moring LLP

(57) ABSTRACT

A vehicle steering assembly has a steering handle for steering a vehicle and a suspension part that can be secured to the vehicle. The steering handle is secured to the suspension part and it can be pivoted with respect to the suspension part about a pivot axis in a steering position and a table position, in which the steering handle can be used as a table.

10 Claims, 3 Drawing Sheets

(56) References Cited

U.S. PATENT DOCUMENTS

| | | | |
|---|---|---|---|
| 2017/0113589 A1* | 4/2017 | Riefe | B62D 1/16 |
| 2017/0253192 A1* | 9/2017 | Faist | G06F 3/0219 |
| 2019/0118852 A1* | 4/2019 | Suzuki | B62D 1/183 |
| 2019/0241205 A1* | 8/2019 | Toyama | B60N 2/0244 |
| 2020/0055481 A1* | 2/2020 | Mimura | B60R 21/0134 |

FOREIGN PATENT DOCUMENTS

| | | |
|---|---|---|
| DE | 196 24 003 A1 | 12/1997 |
| DE | 10 2012 024 793 A1 | 6/2014 |
| DE | 20 2016 005 986 U1 | 2/2018 |
| EP | 1839934 A2 | 10/2007 |
| FR | 2 983 134 A1 | 5/2013 |
| GB | 2 462 850 A | 2/2010 |
| JP | 2015-209196 A | 11/2015 |
| WO | WO 00/12352 A1 | 3/2000 |

OTHER PUBLICATIONS

German-language Written Opinion (PCT/ISA/237) issued in PCT Application No. PCT/EP2018/056323 dated Jun. 25, 2018 (seven (7) pages).

German-language Search Report issued in counterpart German Application No. 102017206872.8 dated Apr. 3, 2018 with partial English translation (14 pages).

Chinese Office Action issued in Chinese application No. 201880025525.7 dated Jun. 3, 2021, with partial English translation (Fourteen (14) pages).

\* cited by examiner

VEHICLE STEERING ASSEMBLY

CROSS REFERENCE TO RELATED APPLICATIONS

This application is a continuation of PCT International Application No. PCT/EP2018/056323, filed Mar. 14, 2018, which claims priority under 35 U.S.C. § 119 from German Patent Application No. 10 2017 206 872.8, filed Apr. 24, 2017, the entire disclosures of which are herein expressly incorporated by reference.

BACKGROUND AND SUMMARY OF THE INVENTION

The present invention relates to a steering assembly of a vehicle, as well as a vehicle with the steering assembly.

Vehicles of the current state of the art usually have a steering handle. The steering handle may be designed for example as a steering wheel or in some other form. The steering handle may be grasped by the driver and turned by the driver. The turning of the steering handle brings about a swiveling of the wheels and thus a steering of the vehicle by mechanical connection to the steering gear or a steer-by-wire guidance.

One problem which the present invention proposes to solve is to provide a more practicable organization of the interior space of a vehicle for the passengers.

A solution for the problem is a steering assembly of a vehicle. The vehicle is, in particular, a two-track vehicle, such as a car or truck. The steering assembly comprises a steering handle for steering the vehicle. The steering handle can be grasped by the driver of the vehicle. In particular, the steering handle is a steering wheel. However, the steering handle may also have a different configuration, for example, two steering horns.

The steering assembly comprises a suspension. The suspension can be fastened in the vehicle. Thus, for example, the suspension is fastened to a dashboard area of the vehicle or, as will be further explained, to the vehicle seat. The steering handle, in turn, is fastened to the suspension.

In regard to the rotary movement for steering, the steering handle may be connected in rotationally fixed manner to the suspension. In this way, the suspension also rotates with the steering. The suspension can be mechanically connected to a steering gear of the vehicle, so that it is a classical steering. The suspension in particular is designed as a steering column.

In addition or alternatively to the mechanical connection of the suspension to the steering gear, it is also provided that the steering assembly is designed as a steer-by-wire guidance. A rotary movement of the suspension is detected by sensors and, in response to this, the steering gear is actuated.

Furthermore, it is provided that the steering handle can rotate with respect to the suspension in regard to the rotary movement for the steering. The steering assembly in this case is designed as a steer-by-wire guidance. The turning of the steering handle with respect to the suspension is detected by sensor and used to actuate the steering gear.

Moreover, it is provided according to the invention that the steering handle is pivotably fastened to the suspension. Thus, the steering handle can pivot about a pivot axis with respect to the suspension. The pivot axis in particular stands perpendicular to the axis of rotation about which the steering handle is turned during the steering.

Moreover, the pivot axis preferably stands parallel, especially with a deviation of up to +/−10°, to the transverse axis of the vehicle, and perpendicular, especially with a deviation of up to +/−10°, to the vehicle vertical axis.

By pivoting the steering handle about the pivot axis, the steering handle can be pivoted into a steering position and a table position. In the steering position, the steering handle is oriented in a customary position for the steering of the vehicle. In the table position, the steering handle can no longer be used for steering, but instead can be used as a table. The steering handle is used as a table for example to set objects down on it. In particular, the steering handle is pivoted into the table position when the vehicle is being driven autonomously or is parked.

The pivoting of the steering handle relative to the suspension occurs, in one preferred embodiment, manually, by a force exerted by the driver on the steering handle. In particular, it is provided that the pivot position of the steering handle relative to the suspension is secured by way of a lock, which can be released by the driver for the pivoting of the steering handle.

Furthermore, it is preferably provided that the steering handle can pivot by motor relative to the suspension.

Preferably, the steering handle comprises at least one activating element, such as a knob or a rotary wheel or a touch display. The activating element can be activated by the driver. By means of the activating element, for example, a horn is activated or some other function of the vehicle is controlled. Preferably, it is provided that the activating element can be automatically deactivated or activated, or another function is obtained, by pivoting the steering handle into the table position. By "another function" it is meant that the activating element actuates another function of the vehicle in the steering position than in the table position.

Preferably, the steering handle can pivot by at least 30°, especially by at least 45°, especially preferably by at least 55°, about the pivot axis. In the steering position, the steering handle usually stands with a relatively small angle to the vehicle vertical axis. Thanks to the sufficiently large pivot angle, the steering handle can be pivoted down to a horizontal table position.

The connection between suspension and steering handle is preferably designed to pivot the steering handle into the table position, wherein the steering handle in the table position stands at +/−10° to the horizontal or to the plane formed by the vehicle lengthwise axis and vehicle transverse axis.

Especially preferably, the steering handle comprises a continuously level surface of at least 100 cm$^2$, especially at least 200 cm$^2$, especially preferably at least 300 cm$^2$, which can be used as a support in the table position. This level surface in particular has no noteworthy curvatures or gaps which might present a disturbance when using the steering handle as a table.

All the angles and positions of the steering handle refer to the plane or surface of the steering handle which can also be used as a table. In the steering position, this plane or surface of the steering handle is facing toward the driver. In the table position, this plane or surface is substantially horizontal.

Preferably, it is provided that the steering handle can be fixed in at least one intermediate position, preferably in multiple intermediate positions, between the steering position and the table position. This makes it possible to make the steering handle somewhat more flat relative to the steering position by pivoting about the pivot axis. In such an intermediate position, the steering handle may be used in particular as a support surface for an object, such as a tablet or a book.

Furthermore, it is preferably provided that a holder is integrated in the steering handle. The holder can be folded out and/or extended from the steering handle. The folding out or extending can be done by hand or driven by motor. It is not provided that the holder is placed on the steering handle only when in use; instead, the holder is integrated in the steering handle, is always present in the steering handle, and is folded out or extended when in use. In a relatively simple embodiment, the holder is configured as a lower support for the object, especially a tablet or book, and it prevents the object from slipping. In particular, the holder is arranged on the lower area of the steering handle, so that when the steering handle is in a slanted position, such as the above-described intermediate position, the object placed on the steering handle cannot slide down.

Furthermore, it is preferably provided that a cup holder is integrated in the steering handle. The cup holder is always present in the steering handle and it is used in particular in the table position. For example, the cup holder can be folded out and/or extended from the steering handle. This also can be done by hand or driven by motor, as with the above-described holder. In addition or alternatively, it is provided that the cup holder comprises a depression in the steering handle.

According to the invention described here, the steering assembly is fastened by the suspension at any given place in the vehicle, such as the dashboard area.

In one preferred embodiment, it is provided that the steering assembly is fastened to a vehicle seat inside the vehicle. Thus, the present invention relates to a vehicle seat with the described steering assembly, the suspension of the steering assembly being fastened to the vehicle seat. This makes it possible to move, in particular to shift or turn, the entire steering assembly together with the vehicle seat relative to the rest of the vehicle.

Thus, it is possible for the steering handle to always have the same distance from the driver on the vehicle seat, both in the steering position and in the table position. Furthermore, when the vehicle seat can rotate inside the vehicle, this makes it possible for the steering handle to also rotate. This is especially practicable when using the steering handle as a table.

For the fastening of the steering assembly to the vehicle seat, it is provided in particular that the steering assembly is designed as a steer-by-wire guidance.

The invention moreover relates to a vehicle with the described vehicle seat. It is provided in particular that the vehicle seat along with the steering assembly fastened to it is arranged displaceable with respect to the vehicle and/or tiltable and/or rotatable in at least one direction. The vehicle is particularly preferably a self-driving vehicle.

The invention moreover relates to a vehicle with the described steering assembly, regardless of the fastening of the suspension to the seat or elsewhere in the vehicle. The vehicle is particularly preferably a self-driving vehicle.

It is preferably provided for the described vehicle that the airbag usually arranged in the steering handle is arranged in another place, such as in the dashboard area of the vehicle. Other elements which are usually provided in the steering handle, such as the horn, may be arranged elsewhere in the vehicle.

The invention moreover relates to a steering handle of a vehicle with an integrated cup holder and/or an integrated holder. Thus, the cup holder already described and/or the holder already described can be integrated in the steering handle, regardless of whether the steering handle can pivot into the table position. The holder can be folded out and/or extended from the steering handle. The folding out or extending can be done by hand or driven by motor. It is not provided that the holder is placed on the steering handle only when in use; instead, the holder is integrated in the steering handle, is always present in the steering handle, and is folded out or extended when in use. In a relatively simple embodiment, the holder is configured as a lower support for an object, especially a tablet or book, and it prevents the object from slipping. In particular, the holder is arranged on the lower area of the steering handle, so that when the steering handle is in a slanted position, the object placed on the steering handle cannot slide down. The cup holder is always present in the steering handle. For example, the cup holder can be folded out and/or extended from the steering handle. This also can be done by hand or driven by a motor, as with the above-described holder. In addition or alternatively, it is provided that the cup holder comprises a depression or recess in the steering handle.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
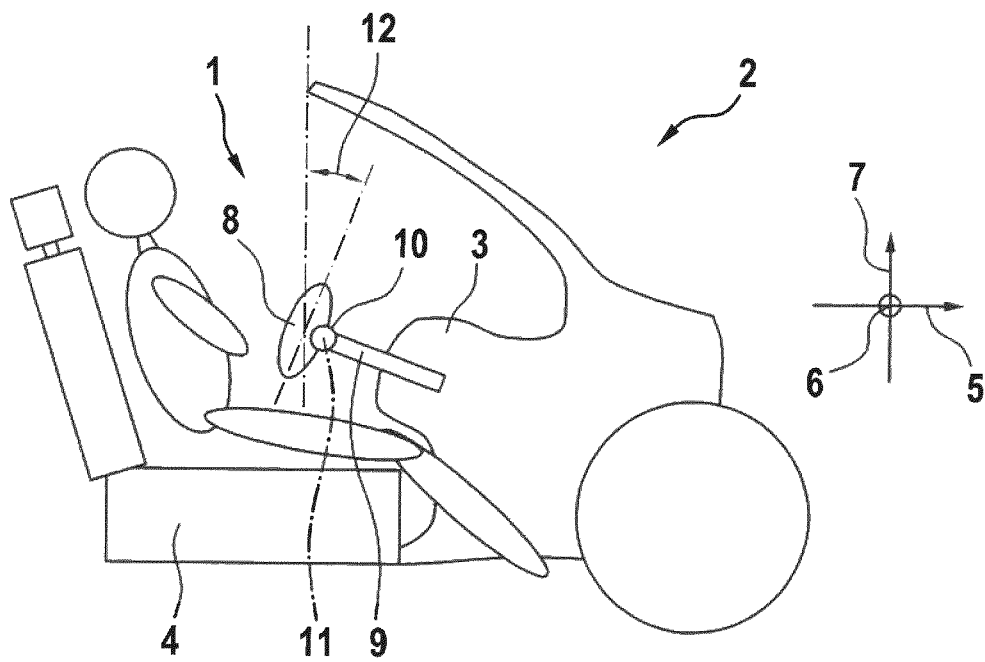
FIG. 1 is a schematic representation of a steering assembly according to an embodiment of the invention, in the steering position.

The figures show a steering assembly 1 in a vehicle 2.

Regarding the vehicle 2, there are defined a vehicle lengthwise axis 5, a vehicle transverse axis 6, and a vehicle vertical axis 7. The vehicle 2 has a dashboard area 3 and a vehicle seat 4.

The steering assembly 1 comprises a steering handle 8 and a suspension 9. The steering handle 8, configured here as a steering wheel, is fastened to the suspension 9.

The steering handle 8 is fastened to the suspension 9 by a joint assembly 10. The steering assembly 1 enables a pivoting of the steering handle 8 about a pivot axis 11 to adjust a pivot angle 12. The pivot angle 12 is defined between the vehicle vertical axis 7 and a surface of the steering handle 8 which can be used as a table.

The pivot axis 11 stands parallel to the vehicle transverse axis 6 and perpendicular to the vehicle vertical axis 7.

According to the representation in FIG. 1, the steering handle 8 is in a steering position. In this steering position, the steering handle 8 is grasped by the driver so that the steering handle 8 can be used to steer the vehicle 2. A relatively small pivot angle 12 of 20°, for example, is adjusted in this case.

Figure 2:
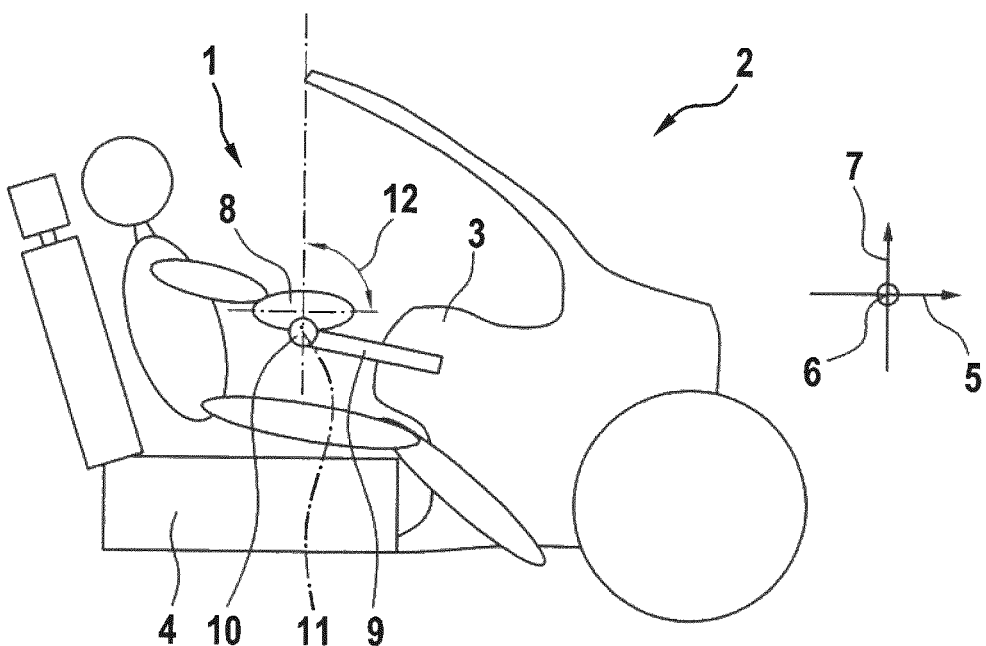
FIG. 2 is a schematic representation of a steering assembly according to the embodiment of the invention, in the table position.

In the representation of FIG. 2, the steering handle 8 is in a table position. The steering handle 8 in this case stands substantially horizontal with a pivot angle 12 of around 90°.

Figure 3:
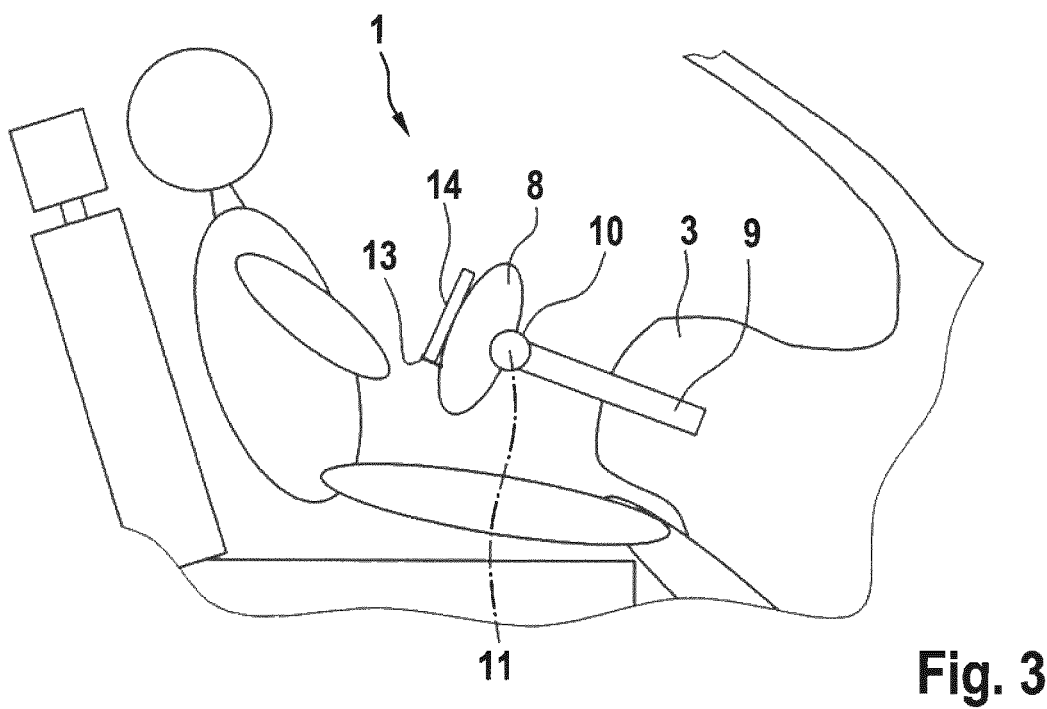
FIG. 3 is a schematic representation of a steering assembly according to the embodiment of the invention in detail, with a holder.

FIG. 3 shows that, according to a preferred embodiment of the present invention, a holder 13 can be integrated in the steering handle 8. This holder 13 is used for example in the steering position or in an intermediate position. The holder 13 is fastened to the steering handle 8 and can be folded and/or moved relative to the steering handle 8. This makes it possible to lower the holder 13 into the steering handle 8 when it is not in use. The representation in FIG. 3 shows that the holder 13 in the lower area of the steering handle 8 is used to secure an object 14 placed on the steering handle 8, such as a tablet or a book, from sliding down.

According to FIGS. 1 to 3, the suspension 9 is fastened to the dashboard area 3 of the vehicle 2.

Figure 4:
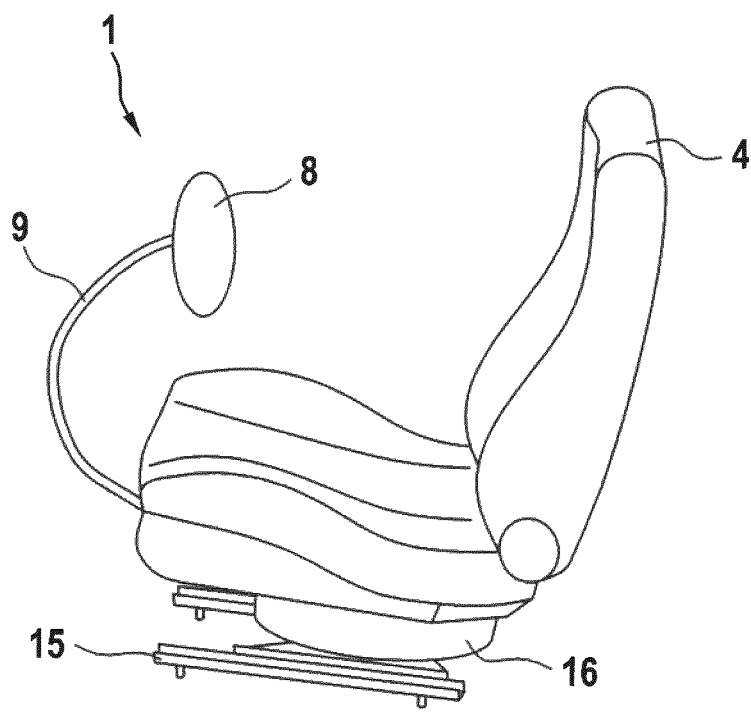
FIG. 4 is a first schematic view of the steering assembly according to an embodiment of the invention, fastened to a vehicle seat.
Figure 5:
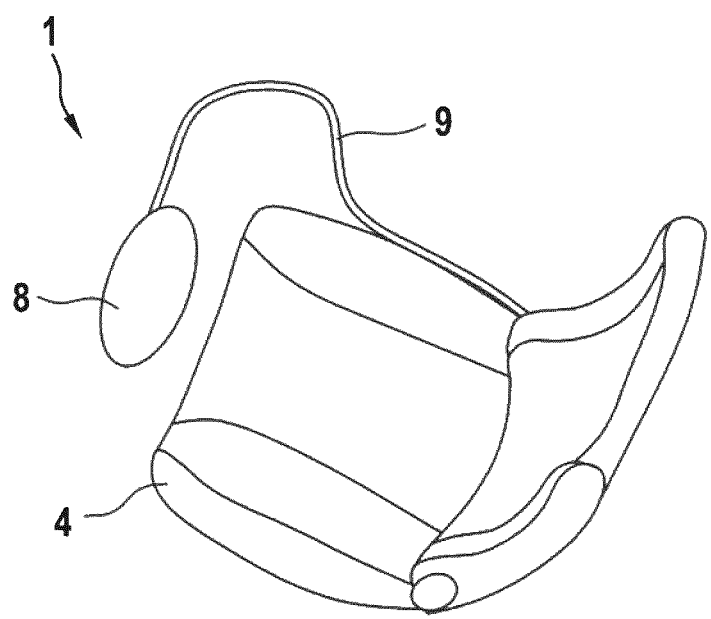
FIG. 5 is a second schematic view of the steering assembly according to an embodiment of the invention, fastened to the vehicle seat.

FIGS. 4 and 5 show another advantageous embodiment of the invention. By contrast with the representations in FIGS. 1 to 3, the suspension 9 of the steering assembly 1 in FIGS. 4 and 5 is fastened directly to the vehicle seat 4.

The vehicle seat 4 is fastened by a seat fastening 15 to the vehicle 2. The seat fastening 15 makes possible a shifting of the vehicle seat 4 relative to the vehicle 2, especially along the vehicle lengthwise axis 5. Furthermore, a rotation device 16 is present between the vehicle seat 4 and the vehicle 2. Due to the rotation device 16, the vehicle seat 4 can be rotated relative to the vehicle 2, especially about the vehicle vertical axis 7. Due to this embodiment, it is possible to arrange the entire steering assembly 1 to be displaceable and rotatable along with the vehicle seat 4 with respect to the vehicle 2.

LIST OF REFERENCE NUMBERS 1 steering assembly
2 vehicle
3 dashboard area
4 vehicle seat
5 vehicle lengthwise axis
6 vehicle transverse axis
7 vehicle vertical axis
8 steering handle
9 suspension
10 joint assembly
11 pivot axis
12 pivot angle
13 holder
14 object
15 seat fastening
16 rotation device The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A steering assembly of a vehicle, comprising:
a steering handle that steers the vehicle, wherein the steering handle is a steering wheel that is rotatable around an axis of rotation about which the steering wheel is turned during steering of the vehicle;
a steering column which is fastenable in the vehicle, wherein the steering wheel is fastened to the steering column, and
wherein the steering wheel is pivotable about a pivot axis with respect to the steering column into a steering position and into a table position such that the steering assembly has a single table, wherein the pivot axis is perpendicular to the axis of rotation, and wherein the steering wheel comprises a continuously level surface that has no curvatures or gaps which would present a disturbance when using the steering wheel as the single table.

2. The steering assembly according to claim 1, wherein the steering wheel pivots by at least 30° about the pivot axis.

3. The steering assembly according to claim 1, wherein the steering wheel pivots by at least 45° about the pivot axis.

4. The steering assembly according to claim 1, wherein the steering wheel pivots by at least 55° about the pivot axis.

5. The steering assembly according to claim 1, wherein a connection between the steering column and steering wheel is configured such that the steering wheel in the table position stands at +/−10° to horizontal.

6. The steering assembly according to claim 1, wherein a cup holder is integrated in the steering wheel.

7. A seat, comprising:
a vehicle seat; and
a steering assembly comprising:
a steering handle that steers a vehicle, wherein the steering handle is a steering wheel that is rotatable around an axis of rotation about which the steering wheel is turned during steering of the vehicle;
a steering column which is fastenable in the vehicle, wherein the steering wheel is fastened to the steering column, and
wherein the steering wheel is pivotable about a pivot axis with respect to the steering column into a steering position and into a table position such that the steering assembly has a single table, wherein the pivot axis is perpendicular to the axis of rotation, wherein the steering wheel comprises a continuously level surface that has no curvatures or gaps which would present a disturbance when using the steering wheel as the single table,
wherein the steering column is fastened to the vehicle seat.

8. A vehicle, comprising:
a steering assembly for the vehicle, the steering assembly comprising:
a steering handle that steers the vehicle, wherein the steering handle is a steering wheel that is rotatable around an axis of rotation about which the steering wheel is turned during steering of the vehicle;
a steering column which is fastenable in the vehicle, wherein the steering wheel is fastened to the steering column, and
wherein the steering wheel is pivotable about a pivot axis with respect to the steering column into a steering position and into a table position such that the steering assembly has a single table, wherein the pivot axis is perpendicular to the axis of rotation, and wherein the steering wheel comprises a continuously level surface that has no curvatures or gaps which would present a disturbance when using the steering wheel as the single table.

9. The vehicle according to claim 8, wherein the vehicle is an autonomous driving vehicle.

10. A vehicle, comprising:
a vehicle seat; and
a steering assembly comprising:
- a steering handle that steers the vehicle, wherein the steering handle is a steering wheel that is rotatable around an axis of rotation about which the steering wheel is turned during steering of the vehicle;
- a steering column which is fastenable in the vehicle, wherein the steering wheel is fastened to the steering column, and
- wherein the steering wheel is pivotable about a pivot axis with respect to the steering column into a steering position and into a table position such that the steering assembly has a single table, wherein the pivot axis is perpendicular to the axis of rotation, wherein the steering wheel comprises a continuously level surface that has no curvatures or gaps which would present a disturbance when using the steering wheel as the single table, wherein the steering column of the steering assembly is fastened to the vehicle seat, and wherein the vehicle seat together with the steering assembly is displaceable with respect to the vehicle.

* * * * *